(12) United States Patent
Sato et al.

(10) Patent No.: US 7,333,601 B2
(45) Date of Patent: *Feb. 19, 2008

(54) TELEPHONE-RECEIVING CALL CENTER SYSTEM

(75) Inventors: Kazuaki Sato, Kawasaki (JP);
 Takayasu Koike, Kawasaki (JP);
 Hiroyuki Kiire, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 498 days.

This patent is subject to a terminal disclaimer.

(21) Appl. No.: 10/746,198

(22) Filed: Dec. 26, 2003

(65) Prior Publication Data

US 2004/0136518 A1 Jul. 15, 2004

Related U.S. Application Data

(62) Division of application No. 09/805,389, filed on Mar. 13, 2001, now Pat. No. 6,711,254.

(30) Foreign Application Priority Data

Oct. 26, 2000 (JP) .............................. 2000-326457

(51) Int. Cl.
 *H04M 3/00* (2006.01)
 *H04M 5/00* (2006.01)

(52) U.S. Cl. .............................. 379/265.02; 379/265.06

(58) Field of Classification Search ........... 379/265.02, 379/265.04–265.06, 266.01–266.04, 67.1, 379/88.22

See application file for complete search history.

(56) References Cited

U.S. PATENT DOCUMENTS

| 5,315,646 A | * | 5/1994 | Babson et al. ......... 379/201.04 |
| 5,982,857 A | | 11/1999 | Brady |
| 6,263,049 B1 | | 7/2001 | Kuhn |
| 6,292,555 B1 | | 9/2001 | Okamoto |
| 6,396,919 B1 | | 5/2002 | Shimada et al. |

FOREIGN PATENT DOCUMENTS

| JP | 5-122378 | 5/1993 |
| JP | 08-214076 | 8/1996 |
| JP | 10-051550 | 2/1998 |

* cited by examiner

*Primary Examiner*—William J. Deane, Jr.
(74) *Attorney, Agent, or Firm*—Katten Muchin Rosenman LLP

(57) ABSTRACT

A call center system used for receiving incoming calls in accordance with the present information has a plurality of terminals, an incoming-call control apparatus and an exchange. Each of the terminals is accommodated by the exchange and includes a display unit as well as a telephone unit; an audio recording & playback unit for recording voices of a conversation between an operator operating the terminal and a caller making an call in a conversation-voice recording file and for playing back voices from the conversation-voice recording file and a response-information-creating unit for creating a response to an incoming call.

10 Claims, 17 Drawing Sheets

208

168

TELEPHONE-RECEIVING CALL CENTER SYSTEM

CROSS-REFERENCE TO RELATED APPLICATION

The present application is a Divisional of U.S. application Ser. No. 09/805,389 filed on Mar. 13, 2001 now U.S. Pat. No. 6,711,254.

BACKGROUND OF THE INVENTION

1. Field of the Invention

In general, the present invention relates to a call center system for receiving phone calls. More particularly, the present invention relates to balanced distribution of loads to receive incoming call among operators working at the call center system.

2. Description of the Related Art

In recent years, there has been increasing the number of enterprises each setting a call center system for receiving phone calls for, among other purposes, improvement of services to give a fast response to an inquiry about a product and improvement of an efficiency to take up an order. In such an environment, most of such enterprises each employ a fixed number of operators for receiving incoming calls, the number of which varies from day to day and even varies hourly in a day. A call center system basically comprises an exchange installed in a building, an ACD (Automatic Call Distribution) apparatus functioning as an incoming-call control unit and a plurality of clients (or terminals) each provided with a function used by an operator to have a voice conversation with a customer making an inquiry about a product or placing an order for a product. The clients are connected to a telephone line by the exchange, which is also referred to as a local exchange. The ACD apparatus is an incoming-call control apparatus used for connecting an incoming call made by a customer to one of the clients in a state of being able to receive an incoming call in rendering a service of responding to an inquiry or service of taking in an order. A client connected to the incoming call creates information on a database in response to the call after or during the call. If an incoming call cannot be responded due to the fact that all the clients are busy, the ACD apparatus displays status of the waiting incoming calls. An operator aware of the displayed status may suspend an operation to create information to be transmitted to a database, record only essentials of the information on a piece of paper and use the memo recorded on the paper later in resumption of the suspended operation to complete the information. As an alternative, the newly incoming call is put in a state of waiting for an operator to become available after completion of an operation to create information to be transmitted as a response.

However, this conventional call center system has the following problems. When the operator records essentials of pending information to be transmitted as a response to the previous incoming call on a piece of paper due to a suspension of an operation to create the information in the event of a newly incoming call unanswered because of the fact that all the clients are busy, a customer making the call is inevitably put in a wait state. In this case, the operator may record the essentials in a hurry and, thus, the essentials are not recorded correctly. If the incorrect essentials are used later for completing the pending information to be transmitted as a response to the previous incoming call, the completed information is also wrong as well. If the newly incoming call is put in a wait state, on the other hand, there is raised a problem of a poor service inevitably putting a customer making the newly incoming call in a wait state till completion of an ongoing operation to create information to be transmitted as a response to the previous incoming call and a poor service caused by an inability to give a fast response to a customer making this newly incoming call.

It is thus an object of the present invention addressing the problems described above to provide a call center system that is capable of fully satisfying customers at a high performance wherein a fixed number of operators operating clients employed in the call center system is capable of responding to incoming calls at the maximum of ability and the operation can be carried out with a high degree of flexibility to keep up with a fluctuating number of incoming calls arriving at the same time.

SUMMARY OF THE INVENTION

In accordance with an aspect of the present invention, there is provided a call center system used for receiving incoming calls and composed of a plurality of terminals; an incoming-call control apparatus for executing incoming-call control based on status of the terminals and for informing the terminals of existence of waiting incoming calls; and an exchange for informing the incoming-call control apparatus of the arrival of an incoming call from an external source such as a public network, wherein the terminals are accommodated by the exchange and each comprise a display unit as well as a telephone unit; an audio recording & playback means for recording voices of a conversation between an operator operating the terminal and a caller making a call in a conversation-voice recording file and for playing back voices from the conversation-voice recording file; a response-information-creating means for creating a response based on the contents of a conversation to an incoming call; a halfway-saving & saving means for saving a halfway response being created in a halfway-response recording file and for saving a completed response in a response recording file in accordance with a command given by the operator; a saved-halfway-response-reading means for reading out the halfway-response recording file containing a halfway response being created in accordance with a command given by the operator; a saved-halfway-response-display means for displaying a halfway response stored in the halfway-response recording file read out by the saved-halfway-response-reading means on the display unit; and a status-notifying means for reporting status of being able or unable to receive an incoming call to the incoming-call control apparatus in accordance with a command given by the operator.

It is desirable to further provide each of the terminals with a command means such as a mouse in the display unit; a waiting-call display means for displaying waiting status of an incoming call, which is reported by the incoming-call control apparatus in case the incoming call cannot be routed to any of the terminals, on the display unit; and a halfway saving operation screen control means operating in accordance with selection of an item from a halfway saving operation screen by clicking the command means as a request to save a halfway response in a halfway-response recording file and selection of an item from the halfway saving operation screen by clicking the command means as a request to read out the halfway-response recording file.

It is also desirable to further provide the call center system with a database server for storing a response recording file used by any of the terminals for recording a response in a response-file-storing database; storing a halfway-response recording file used by any of the terminals for recording a halfway response in a halfway-response-file-storing database; storing a conversation-voice recording file used by any of the terminals for recording the contents of a conversation in a conversation-voice-file-storing database; retrieving a halfway-response recording file from the halfway-response-file-storing database and a conversation-voice recording file associated with the halfway-response recording file from the conversation-voice file-storing-database at a request made by any of the terminals for use in completion of the halfway response stored in the halfway-response recording file; and retrieving a response recording file from the response-file-storing database at a request made by any of the terminals in transmission of the response stored in the response recording file to a caller.

Any of the terminals is allowed to request the database server to retrieve a halfway-response recording file from the halfway-response-file-storing database and a conversation-voice recording file associated with the halfway-response recording file from the conversation-voice-file-storing database. The terminal uses the halfway-response recording file and the conversation-voice recording file associated with the halfway-response recording file to complete the creation of a halfway response recorded in the halfway-response recording file.

The above and other objects, features and advantages of the present invention as well as the manner of realizing them will become more apparent whereas the invention itself will be best understood from a study of the following description and appended claims with reference to attached drawings showing some preferred embodiments of the invention.

DETAILED DESCRIPTION OF THE PREFERRED EMBODIMENTS

Figure 1:
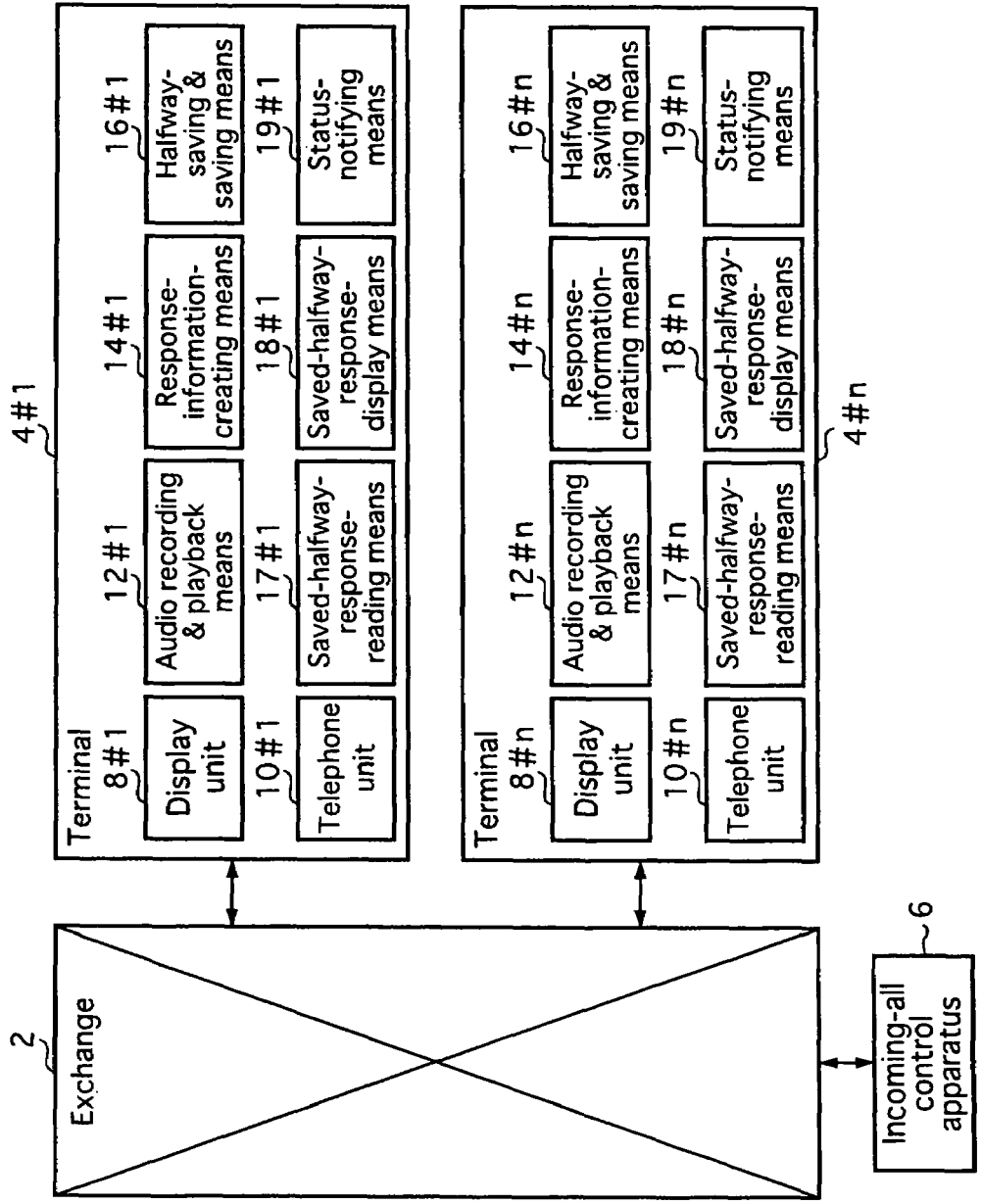
FIG. 1 is a diagram showing the principle of the present invention.

Before preferred embodiments of the present invention are explained, the principle of the invention is described. FIG. 1 is a diagram showing the principle of the present invention. As shown in FIG. 1, a call center system comprises an exchange 2, a plurality of terminals 4#i where i=1 to n accommodated by the exchange 2 and an incoming-call control apparatus 6. Each of the terminals 4#i comprises a display unit 8#i, a telephone unit 10#i, an audio recording & playback means 12#i, a response-information-creating means 14#i, a halfway-saving & saving means 16#i, a saved-halfway-response-reading means 17#i, a saved-halfway-response-display means 18#i and a status-notifying means 19#i. The exchange 2 informs the incoming-call control apparatus 6 of the arrival of an incoming call from an external source such as a public network. The incoming-call control apparatus 6 is monitoring the receivable state of each terminal 4#i. If a terminal 4#i in a receivable state is detected, the incoming-call control apparatus 6 requests the exchange 2 to route the incoming call. It should be noted that, if an incoming call is in a state of waiting for a terminal 4#i to become available to accept the incoming call due to the fact that all the terminals 4#i are busy, the terminals 4#i where i=1 to n are informed of this state. At the request made by the incoming-call control apparatus 6, the exchange 2 forwards the incoming call to the terminal 4#i in a receivable state. As the incoming call arrives at the telephone unit 10#i of the terminal 4#i, the operator of the terminal 4#i starts a conversation with the caller of the incoming call.

The voice recording & playback means 12#i records audio contents of the conversation between the operator and the caller into a conversation-voice recording file. In accordance with an input given by the operator, the response-creating means 14#i creates a response based on the contents of the conversation to the incoming call. As described above, if an incoming call is in a state of waiting for a terminal 4#i to become available to accept the incoming call, the status-notifying means 19#i employed in each terminal 4#i is informed of this state. On the basis of the information on this state, the operator suspends the creation of the response and operates the terminal 4#i to have the halfway-saving & saving means 16#i store the halfway response being created in a halfway-response recording file. The halfway-saving & saving means 16#i stores the halfway response being created in the halfway-response recording file accordingly. In this way, the terminal 4#i enters a receivable state, informing the incoming-call control apparatus 6 of the receivable status. In this state, the incoming-call control apparatus 6 is allowed to route the incoming call to the terminal 4#i.

At a request made by the operator, the saved-halfway-response reading means 17#i reads out the halfway-response recording file containing the halfway response and a conversation-voice recording file associated with the halfway-response recording file. The saved-halfway-response display means 18#i displays the halfway response recorded in the halfway-response recording file on the display unit 8#i. In accordance with a command given by the operator, the voice recording & playback means 12#i plays back the conversation-voice recording file. In accordance with an input by the operator, the response-creating means 14#i completes the creation of the response based on the displayed response and the reproduced conversation. The halfway-saving & saving means 16#i stores the completed response in a response recording file.

In this way, when a plurality of incoming calls is in a state of waiting for a terminal 4#i to accept the incoming calls, the operator of a terminal 4#i is capable of saving a halfway response being created immediately and receiving a next incoming call. Thus, the waiting time of a next customer making a call is made shorter. In addition, the operator is allowed to complete a halfway response saved in a halfway-response recording file whenever the operator becomes available. As a result, a fixed number of operators is capable of receiving incoming calls at the maximum of ability and the call center system can thus be operated with a high degree of flexibility to keep up with a fluctuating number of incoming calls arriving at the same time.

Figure 2:
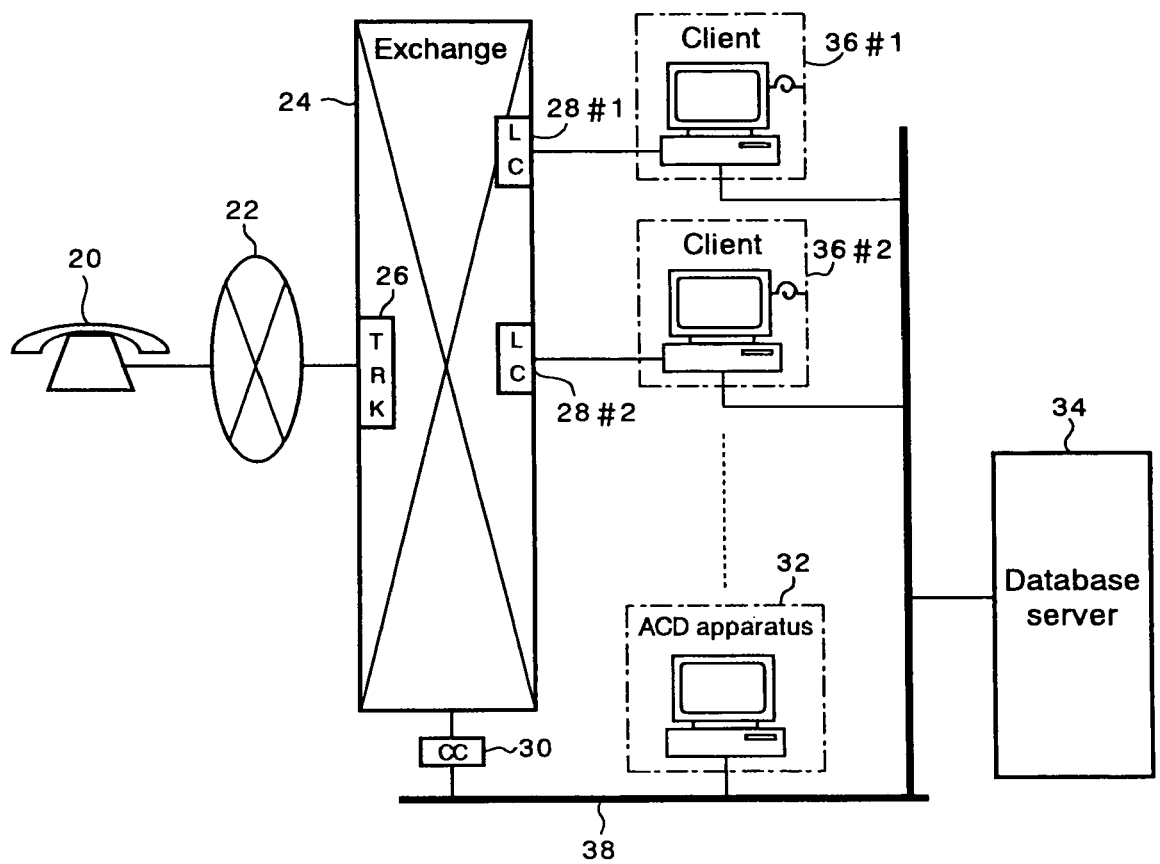
FIG. 2 is a diagram showing the configuration of a call center system implemented by an embodiment of the present invention.

FIG. 2 is a diagram showing the configuration of a call center system implemented by an embodiment of the present invention. A call center system is a telephone-call receiving system for receiving phone calls for, among other purposes, rendering services to give a fast response to an inquiry about a product and to efficiently take up an order for a product. As shown in FIG. 2, the call center system comprises an exchange 24, a central control apparatus (CC) 30, an ACD apparatus 32, a database server 34, a plurality of clients 36#i where i=1, 2 and so on and a LAN 38. The exchange 24 comprises a trunk 26 for interfacing with a public or private network 22 and a plurality of line circuits (LCs) 28#i each used for interfacing with one of the client 36#i. In accordance with control executed by the CC 30, the exchange 24 connects a particular LC 28#i to the trunk 26 at which a phone call made a telephone set 20 through the network 22 and allows a telephone conversation between a caller using the telephone set 20 and a client 36#i connected to the particular LC 28#i. When the incoming call arrives at the trunk 26, the CC 30 informs the ACD apparatus 32 of the arrival of the incoming call and the telephone number of the telephone set 20. Then, the ACD apparatus 32 determines which client 36#i is to receive the incoming call.

Figure 3:
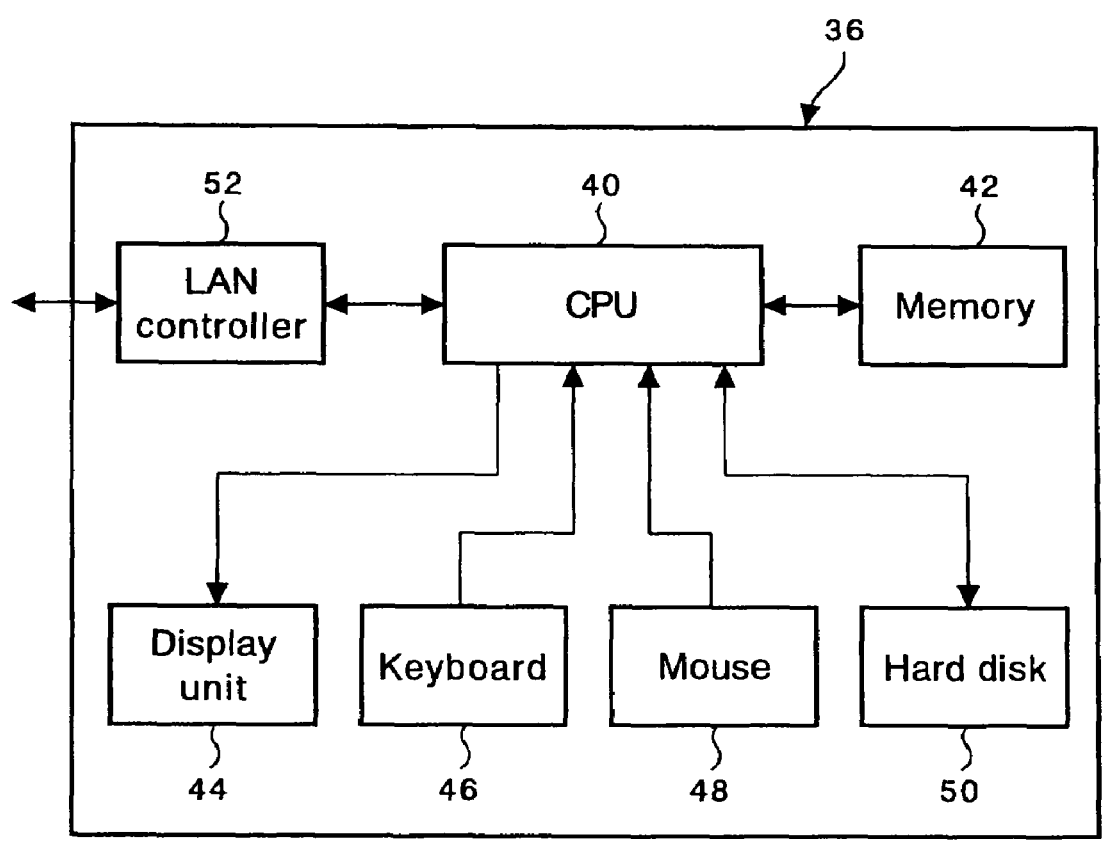
FIG. 3 is a diagram showing the configuration of an ACD apparatus employed in the call center system shown in FIG. 2.

FIG. 3 is a diagram showing the configuration of the ACD apparatus 32 employed in the call center system shown in FIG. 2. As shown in FIG. 3, the ACD apparatus 32 comprises a CPU 40, a memory 42, a display unit 44, a keyboard 46, a mouse 48, a hard disk 50 and a LAN controller 52. The CPU 40 has the following functions:

(1) Catalog the names of operators pertaining to each ACD group into the hard disk 50. Usually, operators are grouped into a plurality of ACD groups each assigned to a specific kind of rendered service of receiving telephone calls arriving at the exchange 24. Typically, each kind of service is associated with a category of products made by an enterprise. It is needless to say that all operators may also pertain to a single group.

(2) Receive a login user name from a client 36#i through the LAN controller 52. A login user name is the name of an operator entered by the operator to the client 36#i when the operator logs in at the client 36#i. The CPU 40 includes information on the client 36#i in the ACD group cataloged in the hard disk 50, associating the information with the login user name.

(3) Manage status of each client 36#i at which an operator logged in. Examples of the status of a client 36#i include working, idle, ringing, in a conversation and unattended. The working status is status of being unable to receive an incoming call due to typically the fact that the client 36#i is being used for creating a response. The idle status is status of being able to receive an incoming call. The ringing status is status of receiving an incoming call as evidenced by the ringer's being activated. The in-a-conversation status is status of being used by the operator for a conversation with a caller. The unattended status is status of being unattended by the operator or status of the operator's absence from the client. It should be noted that the status of a client 36#i may include the number of waiting calls assigned to the operator logged in to the client 36#i. This information is used for balancing distribution of loads among the clients 36#i where i=1, 2 and so on.

(4) Execute preference-based control of incoming calls to be described later to request that the CC 30 routes an incoming call to a client 36#i used by a preferred operator when the CC 30 is informed of the arrival of the incoming call at the trunk 26. The CPU 40 also displays an incoming call on all the clients 36#i where i=1, 2 and so on to inform the operators at the clients 36#i of the existence of the incoming call in case the incoming call is put in waiting status due to the fact that the clients 36#i pertaining to an ACD group associated with the trunk 26 are in a state of being unable to receive incoming calls as evidenced by the working status or the like. The display of the incoming call at a specific client 36#i can be emphasized if the client 36#i is being used by the most preferred operator to receive the incoming call.

(5) Make a list of idle clients 36#j along with the names of operators using the clients 36#j and transfer the list to a client 36#i in response to a request made by the client 36#i for a list of available operators where j≠i.

Figure 4:
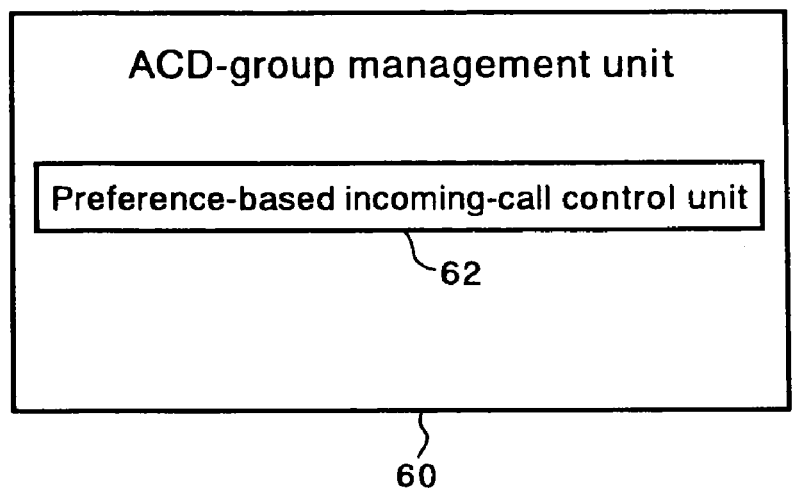
FIG. 4 is a functional block diagram showing the present invention's CPU employed in the ACD apparatus shown in FIG. 3.

FIG. 4 is a functional block diagram showing the present invention's CPU 40 employed in the ACD apparatus 32 shown in FIG. 3. As shown in FIG. 4, the CPU 40 has an ACD-group control unit 60 including a preference-based incoming-call control unit 62 with the following functions:

(1) Request the database server 34 to search a data base for an operator responding in the past to a caller of a phone call arriving at the trunk 26 by using the telephone number of the caller as a search key.

(2) Form a judgment as to whether or not a client 36#i being used by the operator responding in the past to the caller is available.

(i) If the client 36#i being used by the operator responding in the past to the caller is available, execute control to route the incoming call to the client 36#i being used by the operator responding in the past to the caller.

(ii) If the client 36#i being used by the operator responding in the past to the caller is not available or if an operator responding in the past to the caller is not found, on the other hand, execute incoming-call control so as to give a balanced distribution of loads among available clients 36#i pertaining to an ACD group for the trunk 26. It should be noted that, if the client 36#i being used by the operator responding in the past to the caller is not available, a display of the existence of a waiting incoming call at the client 36#i may be emphasized instead of routing the incoming call to another client 36#j where j≠i even if the other client 36#j is available.

(iii) If all clients 36#i pertaining to an ACD group for the trunk 26 are not available, request all the clients 36#i to display the existence of a waiting incoming thereon. The display of the existence of a waiting incoming call at a specific client 36#i can be emphasized by typically being put in a blinking state if the client 36#i is a client being used by the operator responding in the past to the caller.

The memory 42 employed in the ACD apparatus 32 shown in FIG. 3 is used as a main memory for operations carried out by the CPU 40. The display unit 44 is a component used for displaying typically information of the ACD group. The keyboard 46 and the mouse 48 are each an input unit for entering typically the name of an operator pertaining to the ACD group. The hard disk 50 is a memory used for storing information such as the names of operators pertaining to the ACD group. The LAN controller 52 is a component for communicating with the CC 30, the database server 34 and the clients 36#i where i=1, 2 and so on by way of the LAN 38. It should be noted that the communication media is not limited to the LAN 38. That is to say, any communication means can be used as long as the means can be used as communication media.

Figure 5:
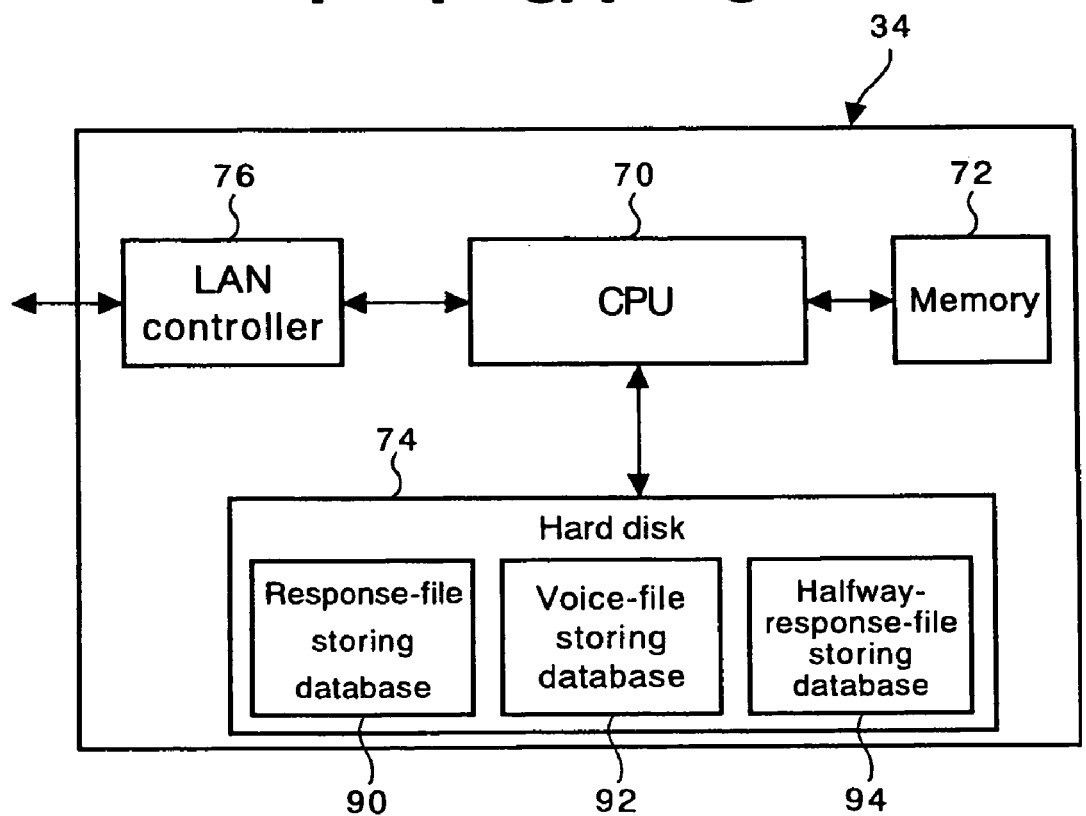
FIG. 5 is a diagram showing the configuration of a database server employed in the call center system shown in FIG. 2.

FIG. 5 is a diagram showing the configuration of the database server 34 employed in the call center system shown in FIG. 2. As shown in FIG. 5, the database server 34 comprises a CPU 70, a memory 72, a hard disk 74 and a LAN controller 76.

Figure 6:
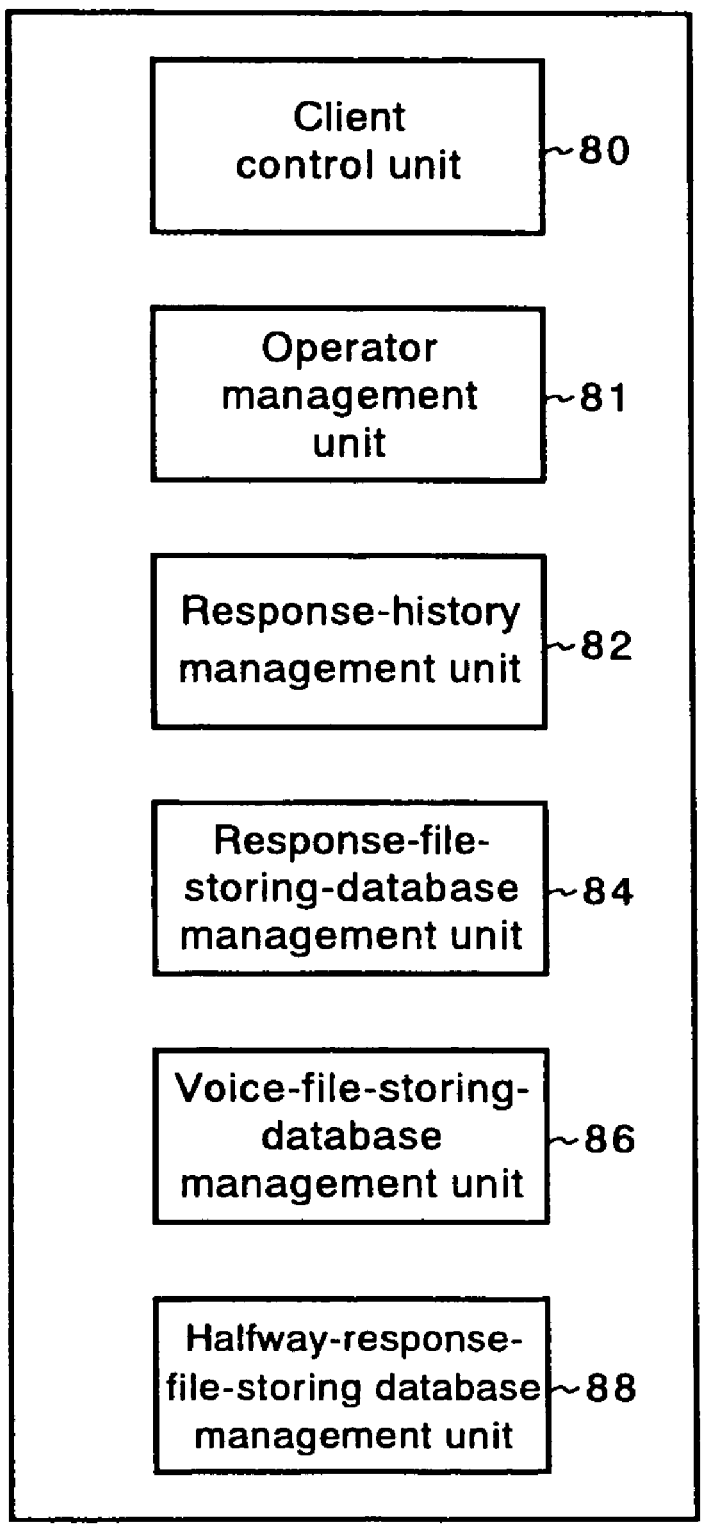
FIG. 6 is a functional block diagram showing the present invention's CPU employed in the database server shown in FIG. 5.

FIG. 6 is a functional block diagram showing the present invention's CPU 70 employed in the database server 34 shown in FIG. 5. As shown in FIG. 6, the CPU 70 comprises a client control unit 80, an operator management unit 81, a response-history management unit 82, a response-file-storing-database management unit 84, a voice-file-storing-database management unit 86 and a halfway-response-file-storing database management unit 88.

The operator management unit 81 searches a response-file-storing database 90 for a response recording file corresponding to the telephone number of a caller at a request made by the ACD apparatus 32. The operator management unit 81 also acquires the name of an operator responding to the caller in the past and transmits the name to the ACD apparatus 32. The response-history management unit 82 searches the response-file-storing database 90 for a past response recording file related to a caller to with the telephone directory number of the caller used as a key in the search operation at a request made by a client 36#i and transmits the past response recording file to the client 36#i making the request. The response-file-storing-database management unit 84 catalogs a completed response recording file received from a client 36#i in the response-file-storing database 90. A response recording file is a file for recording a response completed by the operator on the basis of the contents of a conversation with a caller. The voice-file-storing-database management unit 86 executes the following functions:

(1) Catalog a conversation-voice recording file received from a client 36#i in a voice-file storing database 92. A conversation-voice recording file is a file for recording the audio contents of a conversation with a caller. A conversation-voice recording file is associated with a response created by the operator on the basis of the audio contents of a conversation with a caller and recorded in a halfway-response recording file. A conversation-voice recording file read back from the voice-file-storing database 92 and a halfway-response recording file associated with the conversation-voice recording file and read back from a halfway-response-file storing database 94 are used for completing a response recording file to be stored in the response-file-storing database 90. For this reason, a link is required to associate a conversation-voice recording file with a halfway-response recording file.

Figure 7:
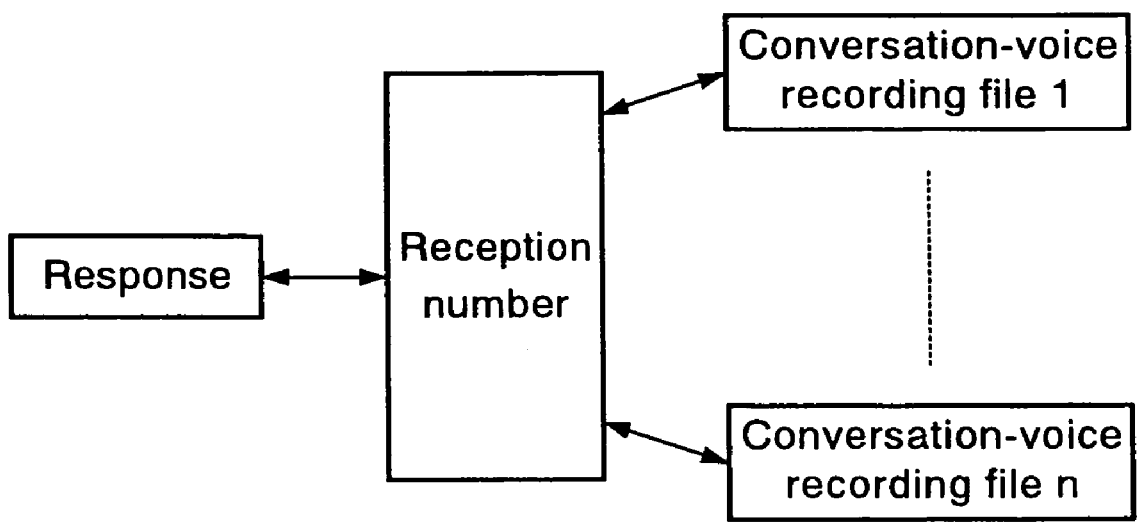
FIG. 7 is a diagram showing a relation between a response and conversation-voice recording files.

FIG. 7 is a diagram showing a relation between a response and conversation-voice recording files. As shown in FIG. 7, a response is linked to a conversation-voice recording file by a reception number, which is a number unique in the system. A reception number is assigned by a client 36#i to a response and used typically as a key for identifying the response and a conversation-voice recording file associated with the response. Thus, a reception number assigned to a response serves as a link between the response and a conversation-voice recording file associated with the response. It should be noted that, taking a telephone transfer to be described later into consideration, FIG. 7 shows deliberately a relation between a single response and a plurality of conversation-voice recording files.

(2) Read out a conversation-voice recording file linked to a halfway-response recording file from the voice-file-storing database 92 in accordance with a command received from the halfway-response-file-storing-database management unit 88 and supply the conversation-voice recording file to a client 36#i.

The halfway-response-file-storing-database management unit 88 executes the following functions:

(1) Catalog a halfway-response recording file received from a client 36#i into the halfway-response-file-storing database 94. A halfway-response recording file is a file for recording a halfway response being created by an operator on the basis of the contents of a conversation between the operator and a caller to which the response is to be transmitted eventually.

(2) Search the halfway-response-file-storing database 94 for halfway responses created by an operator using a client 36#i making a request for the search or for halfway responses created by all operators, make a list of such halfway responses and supply the list to the client 36#i. A list of halfway responses is a list of names each used for identifying a halfway response. A name on the list is typically a reception number described above.

(3) Read out a halfway-response recording file identified by a name specified by a client 36#i from the halfway-response-file-storing database 94 and supply the halfway-response recording file to the client 36#i. The halfway-response recording file supplied to the client 36#i is deleted from the halfway-response-file-storing database 94.

(4) Request the voice-file-storing-database management unit 86 to transmit a conversation-voice recording file associated with a halfway-response recording file identified by a name specified by a client 36#i to the client 36#i.

The memory 72 employed in the database server 34 shown in FIG. 5 is used as a main memory for operations carried out by the CPU 70. The hard disk 74 is a recording medium for storing the response-file-storing database 90, the voice-file-storing database 92 and the halfway-response-file-storing database 94. The LAN controller 76 is a means used for communicating with the ACD apparatus 32 and the clients 36#i where i=1, 2 and so on through the LAN 38.

Figure 8:
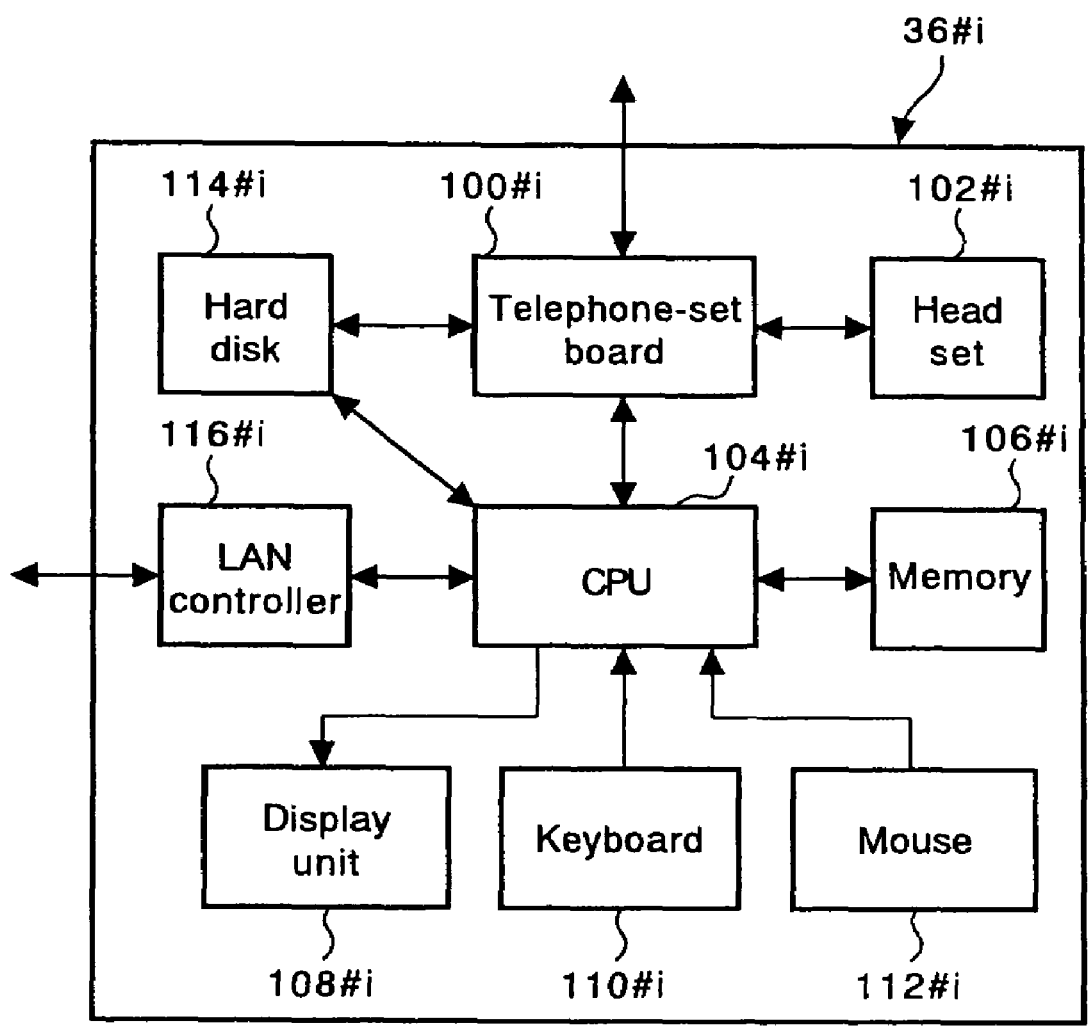
FIG. 8 is a diagram showing the configuration of a client employed in the call center system shown in FIG. 2.

FIG. 8 is a diagram showing the configuration of each client 36#i employed in the call center system shown in FIG. 2. As shown in FIG. 8, a client 36#i comprises a telephone-set board 100#i, a head set 102#i, a CPU 104#i, a memory 106#i, a display unit 108#i, a keyboard 110#i, a mouse 112#i, a hard disk 114#i and a LAN controller 116#i. The telephone-set board 100#i is a board for mounting a unit executing telephone functions. The head set 102#i includes a speaker for outputting a voice generated by the telephone-set board 100#i and a sound generated by a ringer. The head set 102#i also has a mike for picking up a voice of the operator and outputting the voice to the telephone-set board 100#i. The mike is supported by mounting on the head portion of an operator.

Figure 9:
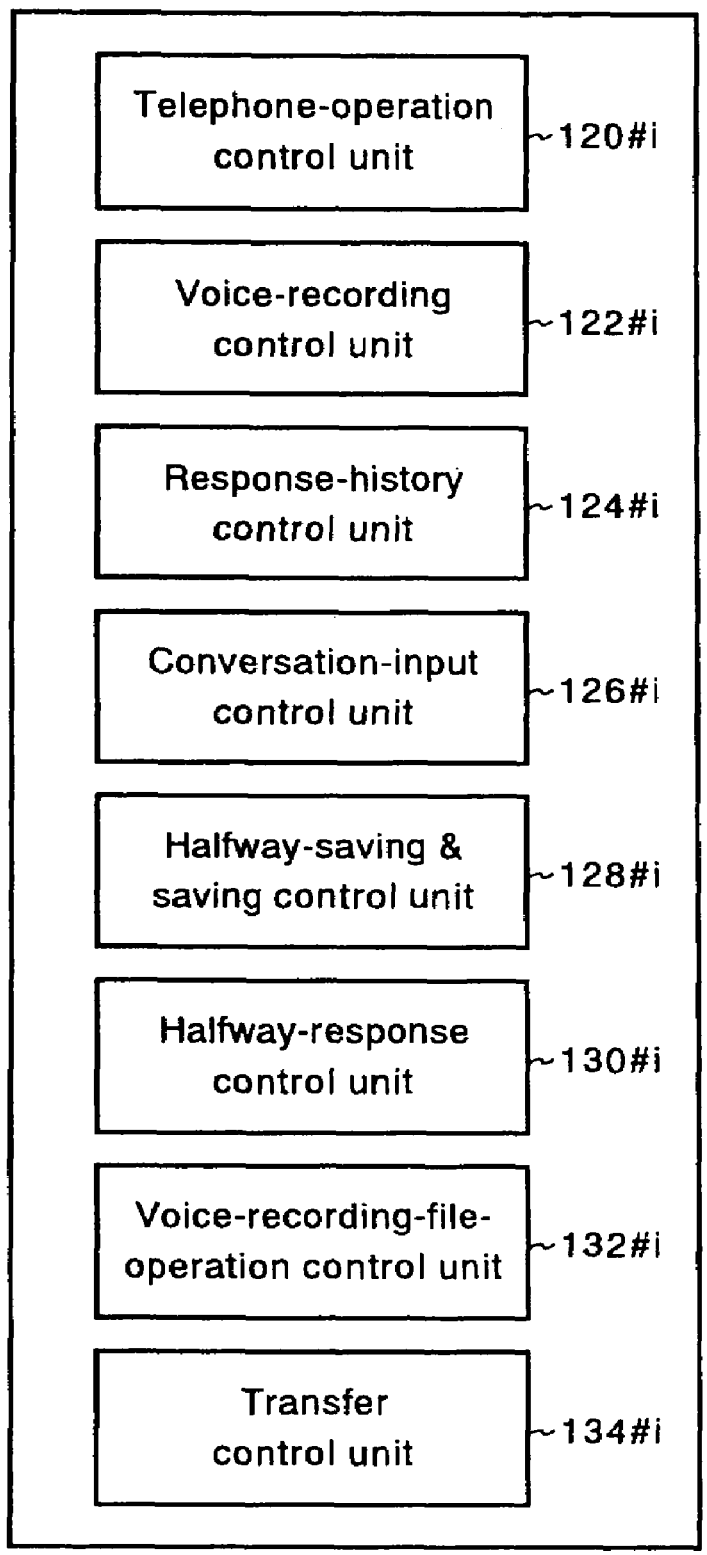
FIG. 9 is a functional block diagram showing the present invention's CPU employed in the client shown in FIG. 8.

FIG. 9 is a functional block diagram showing the present invention's CPU 104#i employed in the client 36#i shown in FIG. 8. As shown in FIG. 9, the CPU 104#i comprises a telephone-operation control unit 120#i, a voice-recording control unit 122#i, a response-history control unit the response-history control unit 124#i, a conversation-input control unit 126#i, a halfway-saving & saving control unit 128#i, a halfway-response control unit 130#i, a voice-recording-file-operation control unit 132#i and a transfer control unit 134#i.

Figure 10:
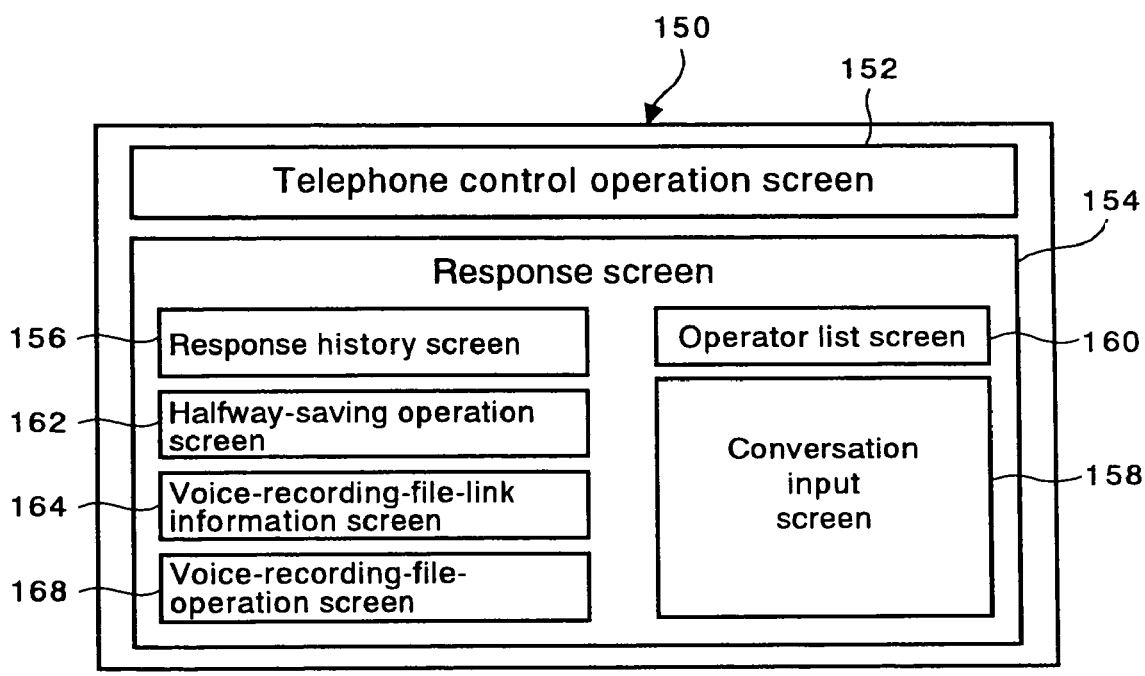
FIG. 10 is a diagram showing a typical screen on a client shown in FIG. 8.

FIG. 10 is a diagram showing a typical screen on the display unit 108#i employed in a client 36#i. As shown in FIG. 10, the client screen displayed on the display unit 108#i comprises a telephone control operation screen 152 and a response screen 154. The telephone control operation screen 152 is a screen used by the operator for giving a command to the telephone-operation control unit 120#i. For example, the telephone-operation control unit 120#i reports working, idle, ringing, in-a-conversation or unattended status of the client 36#i to the ACD apparatus 32 as requested by a click operation on a button displayed on the telephone control operation screen 152. The telephone-operation control unit 120#i also reports such status in a login operation. The response screen 154 comprises a response history screen 156, a conversation input screen 158, an operator list screen 160, a halfway-saving operation screen 162, a voice-recording-file-link information screen 164 and a voice-recording-file-operation screen 168.

Figure 11:
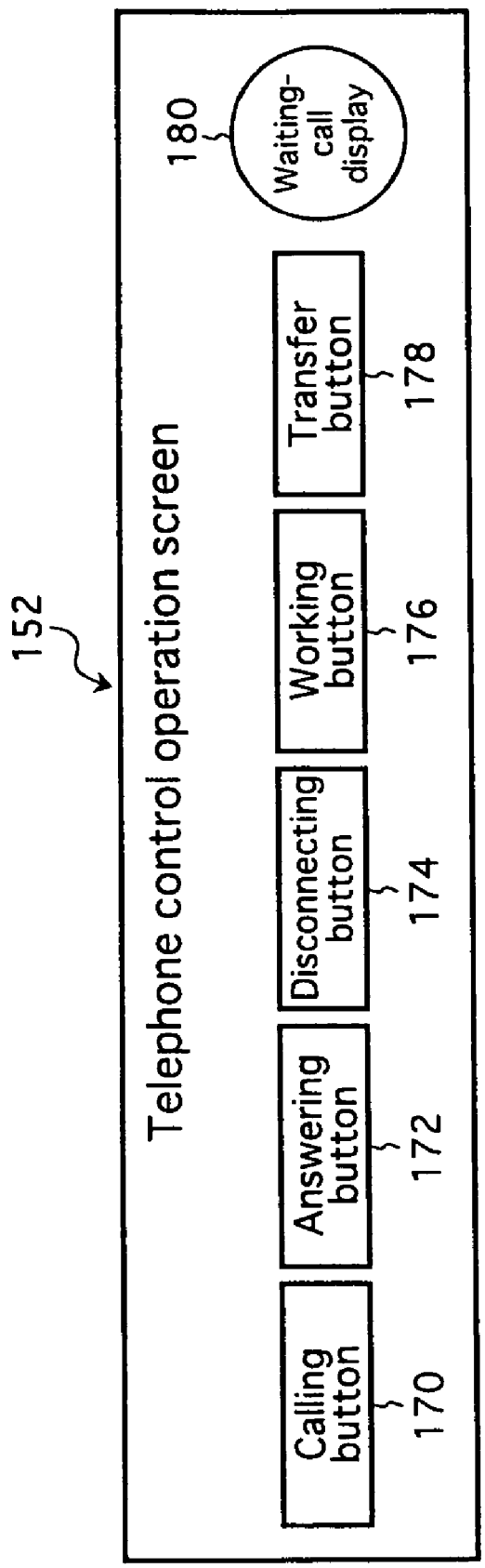
FIG. 11 is a diagram showing a typical phone control operation screen.

FIG. 11 is a diagram showing a typical phone control operation screen 152 used by the operator for giving a command to the telephone-operation control unit 120#i as described above. As shown in FIG. 11, the telephone control operation screen 152 comprises a calling button 170, a answering button 172, a disconnecting button 174, a working-status button 176 and a transfer button 178, which can all be clicked by the operator. When the calling button 170 is clicked, the telephone-operation control unit 120#i issues an off-hook command to the telephone-set board 100#i to allow a call to be made to another client 36#j where j≠i or to the public or private network 22. When the answering button 172 is clicked while the ringer is generating a sound to the head set 102#i, the telephone-operation control unit 120#i issues an off-hook command to the telephone-set board 100#i to allow a conversation to be held with a caller. When the disconnecting button 174 is clicked, the telephone-operation control unit 120#i issues an on-hook command to the telephone-set board 100#i. The working-status button 176 is a button clicked by the operator to set the client 36#i in a state of being unable to receive an incoming call. When the working-status button 176 is clicked to start a work to create a response at the end of a conversation with a customer, the telephone-operation control unit 120#i reports the working status of the client 36#i to the ACD apparatus 32. The working-status button 176 may also clicked in order to set the client 36#i in a state of being able to receive an incoming call upon completion of a login operation to the client 36#i, upon suspension of a work to create a response, upon completion of an operation to save a halfway response or upon completion of a work to create a response. In this case, the telephone-operation control unit 120#i reports the idle status of the client 36#i to the ACD apparatus 32.

When the operator clicks the transfer button 178 after selecting one of other operators on the operator list screen 160, the telephone-operation control unit 120#i requests the telephone-set board 100#i to transfer an incoming call to the client 36#j used by the selected operator, which can be a supervisor.

The telephone control operation screen 152 also includes a waiting-call display 180 displayed by the telephone-operation control unit 120#i to indicate that there is an incoming call put in a waiting state. In particular, if the operator using the client 36#i is an operator preferred for the waiting incoming call, the telephone-operation control unit 120#i emphasizes the waiting-call display 180 by typically putting the waiting-call display 180 in a blinking state.

When the answering button 172 is clicked, the voice-recording control unit 122#i shown in FIG. 9 requests the telephone-set board 100#i to start an operation to record voices of a conversation into the hard disk 114#i. When the disconnecting button 174 is clicked, on the other hand, the voice-recording control unit 122#i requests the telephone-set board 100#i to end an operation to record voices of a conversation into the hard disk 114#i. When receiving the telephone number of a caller from the telephone-set board 100#i, the response-history control unit 124#i assigns a reception number to the telephone number and then requests the database server 34 to transmit a response history indicated by the reception number assigned to the telephone number. Subsequently, the response-history control unit 124#i displays the response history received from the database server 34 on the response history screen 156. The response history displayed on the response history screen 156 is used by the operator as a base for creating a proper response to the caller. The conversation-input control unit 126#i controls an operation carried out by the operator to create a response on the conversation input screen 158 on the basis of the contents of a conversation between the operator and a customer. The conversation input screen 158 is a screen allowing an item selectable from a menu to be entered quickly and correctly. The halfway-saving operation screen 162 shown in FIG. 9 is a screen used by the operator for giving a command to the halfway-saving & saving operation control unit 128#i and the halfway-response control unit 130#i.

Figure 12:
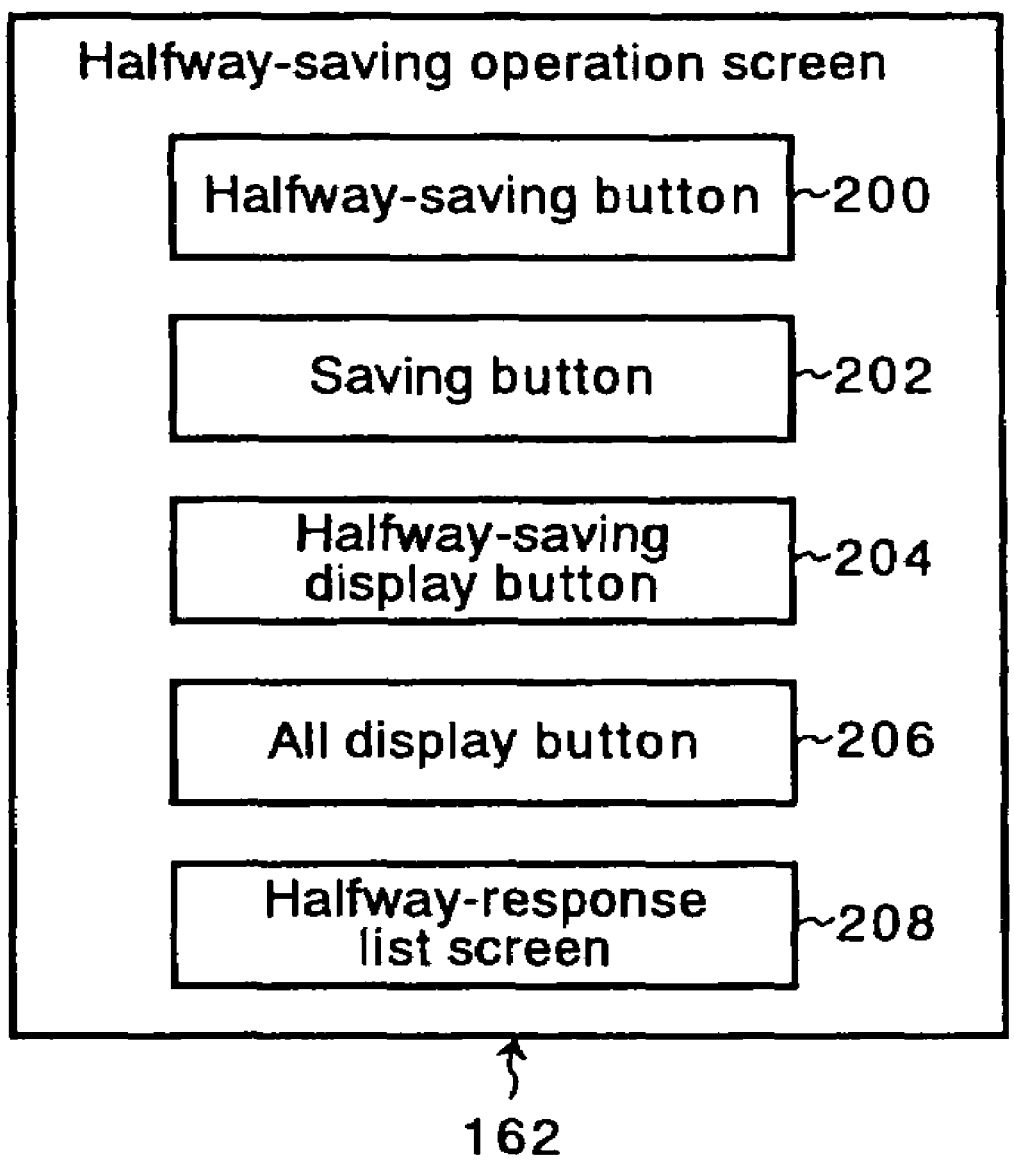
FIG. 12 is a diagram showing a typical halfway saving operation screen.

FIG. 12 is a diagram showing a typical halfway saving operation screen 162. As shown in FIG. 12, the halfway-saving operation screen 162 comprises a halfway-saving button 200, a saving button 202, a halfway-response display button 204, all display button 206 and a halfway-response list screen 208. When the halfway-saving button 200 is clicked, the halfway-saving & saving operation control unit 128#i supplies a conversation-voice recording file stored in the hard disk 114#i, a halfway-response recording file being created by the operator and a reception number to the database server 34. When the saving button 202 is clicked, the halfway-saving & saving operation control unit 128#i supplies a conversation-voice recording file stored in the hard disk 114#i, a response recording file completed by the operator and a reception number to the database server 34.

When the halfway-response display button 204 is clicked, the halfway-response control unit 130#i transmits the name of an operator using the client 36#i to the database server 34, requesting the database server 34 to output a list of reception numbers assigned to halfway responses to be completed by the operator. Such a list is referred to simply as a halfway-response list. The halfway-response control unit 130#i then displays the halfway-response list received from the database server 34 on the halfway-response list screen 208.

Figure 13:
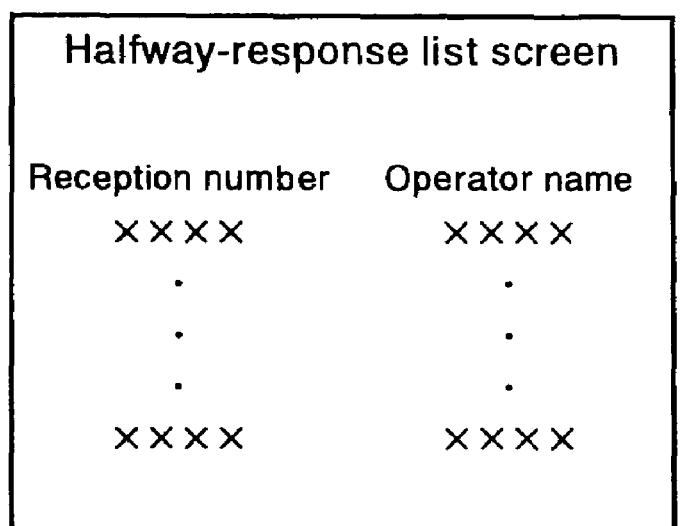
FIG. 13 is a diagram showing a typical halfway-response list screen.

FIG. 13 is a diagram showing a typical halfway-response list screen 208. As shown in FIG. 13, the halfway-response list screen 208 shows a list of halfway-response recording files remaining to be completed by the operator and reception numbers each assigned one of the halfway-response recording files. On the other hand, the voice-recording-file-link information screen 164 shown in FIG. 10 displays halfway-response recording files each indicated by a reception number shown in the halfway-response list screen 208 and conversation-voice recording files, which are each created by the conversation-input control unit 126#i and linked to one of the halfway-response recording files. When the operator clicks a reception number associated with the name of the operator as shown in the halfway-response list screen 208, the halfway-response control unit 130#i requests the database server 34 to output a halfway-response recording file indicated by the clicked reception number and a conversation-voice recording file associated with the halfway-response recording file as shown in the voice-recording-file-link information screen 164. The halfway-response control unit 130#i then stores the halfway-response recording file and the conversation-voice recording file received from the database server 34 into the hard disk 114#i. When the all display button 206 is clicked, a list of halfway-response recording files created by all operators are displayed in the same format as the halfway-response list screen 208 displayed by clicking the halfway-response display button 204 except for displaying a list associated with the operator or not.

Figure 14:
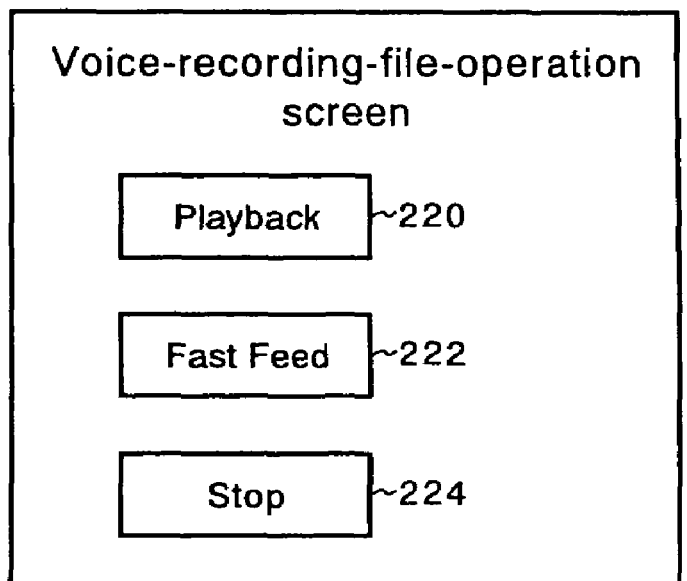
FIG. 14 is a diagram showing a typical conversation-voice recording file operation screen.

FIG. 14 is a diagram showing a typical conversation-voice recording file operation screen 168 for operating the conversation-voice recording file. As shown in FIG. 14, the voice-recording-file operation screen 168 displays a playback button 220, a fast-feed button 222 and a stop button 224. When the playback button 220 is clicked, the voice-recording-file-operation control unit 132#i requests the telephone-set board 100#i to play back the conversation-voice recording file. When the fast-feed button 222 is clicked, the voice-recording-file-operation control unit 132#i requests the telephone-set board 100#i to play back the conversation-voice recording file at a high speed. When the stop button 224 is clicked, the voice-recording-file-operation control unit 132#i requests the telephone-set board 100#i to halt an operation to play back the conversation-voice recording file.

When the operator list screen 160 is clicked, the transfer control unit 134#i requests the ACD apparatus 32 to transmit a list of names of operators to which a work to create a response recording file can be transferred. A list of such operator names received from the ACD apparatus 32 is displayed on the operator list screen 160. When the name of an operator on the list is clicked, a halfway-response recording file, a conversation-voice recording file linked to the halfway-response recording file and a reception number assigned to the halfway-response recording file are transferred to a client 36#j used by the operator the name of which is clicked, where j≠i. The client 36#j stores the halfway-response recording file and the conversation-voice recording file transferred from the client 36#i in the hard disk 114#j. In this way, the client 36#j is capable of succeeding to the work to create a response.

The memory 106#i employed in the client 36#i shown in FIG. 8 is used as a main memory for operations carried out by the CPU 104#i. The display unit 108#i is a display means for displaying a client screen. The keyboard 110#i and the mouse 112#i are each an input unit used typically in creation of a response recording file. The hard disk 114#i is a memory used in creation of a conversation-voice recording file and a response recording file. The LAN controller 116#i is a component for communicating with the ACD apparatus 32, the database server 34 and other clients 36#j where j≠i by way of the LAN 38.

The following description explains the operation of the call center system shown in FIG. 2.

(1) Operator Cataloging

When an operator logs in to a client 36#i by entering a name, the name is transmitted to the ACD apparatus 32. The ACD apparatus 32 catalogs the operator name and the client 36#i in an ACD group, setting the operator in working status. When the working-status button 176 displayed on the telephone control operation screen 152 is clicked, the client 36#i informs the ACD apparatus 32 of the clicking. Informed of the clicking, the ACD apparatus 32 sets the client 36#i in idle status.

(2) Control of Incoming Calls

When a customer presses buttons of the telephone set 20 to enter the telephone number of the call center, a call to the trunk 26 of the call center system is made through the public or private network 22. The CC 30 informs the ACD apparatus 32 of the arrival of the call at the trunk 26 through the network 22 and the telephone number of the telephone set 20. The ACD apparatus 32 identifies an ACD group from the trunk 26 receiving the call and executes incoming-call control represented by a flowchart shown in FIG. 15 as follows. As shown in the figure, the flowchart begins with a step S2 at which the telephone number of the telephone set 20 is received. At the next step S4, the database server 34 is requested to output the customer's history information based on the telephone number. The database server 34 searches the response-file-storing database 90 for history information corresponding to the telephone number. The database server 34 extracts the names of operators responding to the caller identified by the telephone number in the past from the history information and transmits the operator names to the ACD apparatus 32. At the next step S6, the ACD apparatus 32 forms a judgment as to whether or not the incoming call was made by a new customer. The judgment is based on the names of the operators received from the database server 34. If the incoming call was not made by a new customer, the flow of the control goes to a step S8. If the incoming call was made by a new customer, on the other hand, the flow of the control goes to a step S10. At the step S8, preference-based incoming-call control to be described later is executed. At the step S10, on the other hand, non-preference-based incoming-call control to be described later is executed.

(a) Preference-Based Incoming-Call Control

Figure 15:
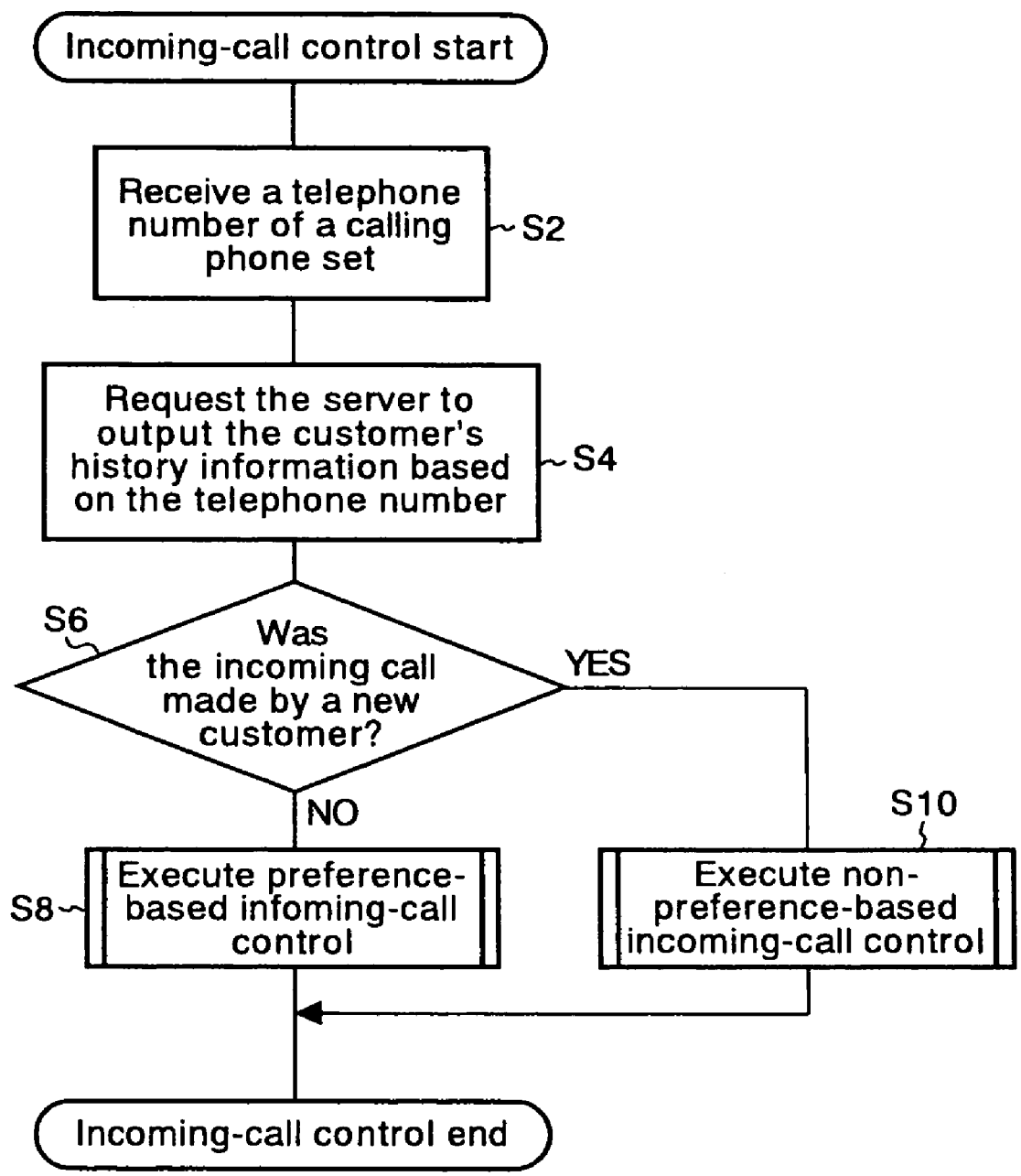
FIG. 15 is a flowchart of incoming-call control.
Figure 16:
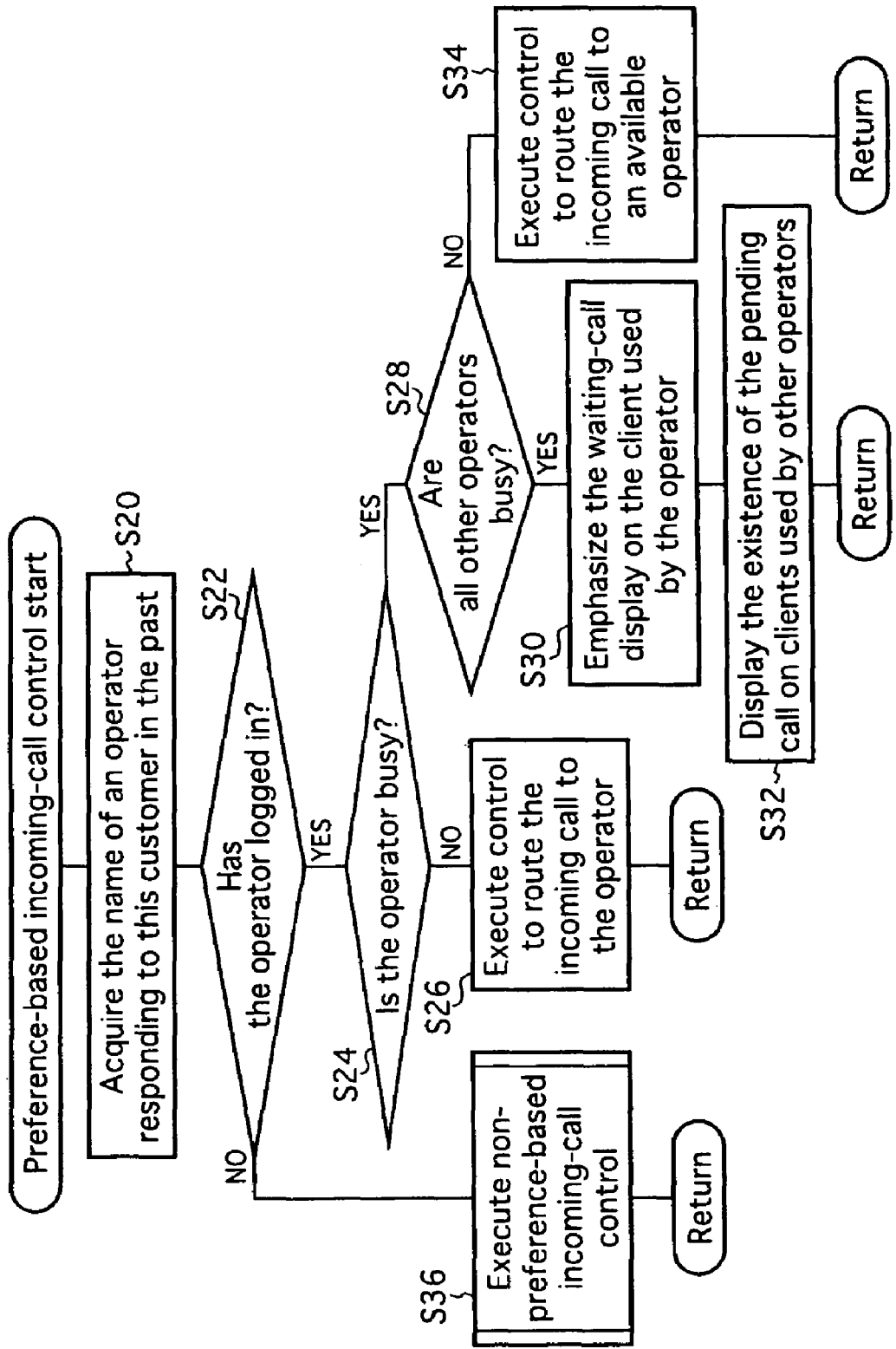
FIG. 16 is a flowchart of incoming-call control executed on a preference basis.

FIG. 16 is a flowchart of incoming-call control executed on a preference basis at the step S8 of the flowchart shown in FIG. 15. The flowchart shown in FIG. 16 begins with a step S20 at which the name of an operator responding to the customer in the past is acquired. The flow of the control then goes on to a step S22 to form a judgment as to whether or not the operator has logged in. If the operator has logged in, the flow of the control goes on to a step S24 to form a judgment as to whether or not the operator is in working status. If the operator has not logged in, on the other hand, the flow of the control goes on to a step S36. If the outcome of the judgment formed at the step S24 indicates that the operator is not in working status, the flow of the control goes on to a step S26 at which the CC30 is requested to control the exchange 24 to route the incoming call to a client 36#i used by the operator. As a result, the operator who has responded to the customer in the past can receive the incoming calls so that the efficiency of the service to provide a response can be improved.

If the outcome of the judgment formed at the step S24 indicates that the operator is in working status, on the other hand, the flow of the control goes on to a step S28 to form a judgment as to whether or not all the operators are busy, that is, all the operators are in working status or in-a-conversation status, being unable to receive the incoming call. If all the operators are busy, the flow of the control goes on to a step S30. If not all the operators are busy, on the other hand, the flow of the control goes on to a step S34. At the step S30, a command is issued to emphasize a waiting-call display on a client 36#i used by the operator responding to the customer in the past. The client 36#i emphasizes the waiting-call display 180 accordingly. At the next step S32, a command is issued to display the waiting-call display 180 on clients 36#j used by the other operators in a deemphasized state. The clients 36#j each display the waiting-call display 180 in a deemphasized state accordingly. Getting aware of the waiting-call display emphasized at the step S30, the operator using the client 36#i realizes that there is a waiting call for the operator, saving a halfway response recording file being created. In this way, the operator is capable of quickly responding to the waiting call. At the step S34, the incoming call is routed to an available operator not in working status. If there is a plurality of available operators, the incoming call is routed to one of them selected on the basis of incoming-call counts computed in advance. That is to say, an available operator having a smallest number of incoming calls serviced so far is selected so as to give a balanced distribution of loads among the operators. It should be noted that, instead of routing an incoming call to another client 36#j in a state of being able to receive a call where j≠i in case the operator using the client 36#i is in working status as described above, a policy can be set to keep the waiting-call display 180 of the client 36#i in an emphasized state till the operator becomes available without regard to the status of the other clients 36#j. At the step S36, the non-preference-based incoming-call control described below is executed.

(b) Non-Preference-Based Incoming-Call Control

Figure 17:
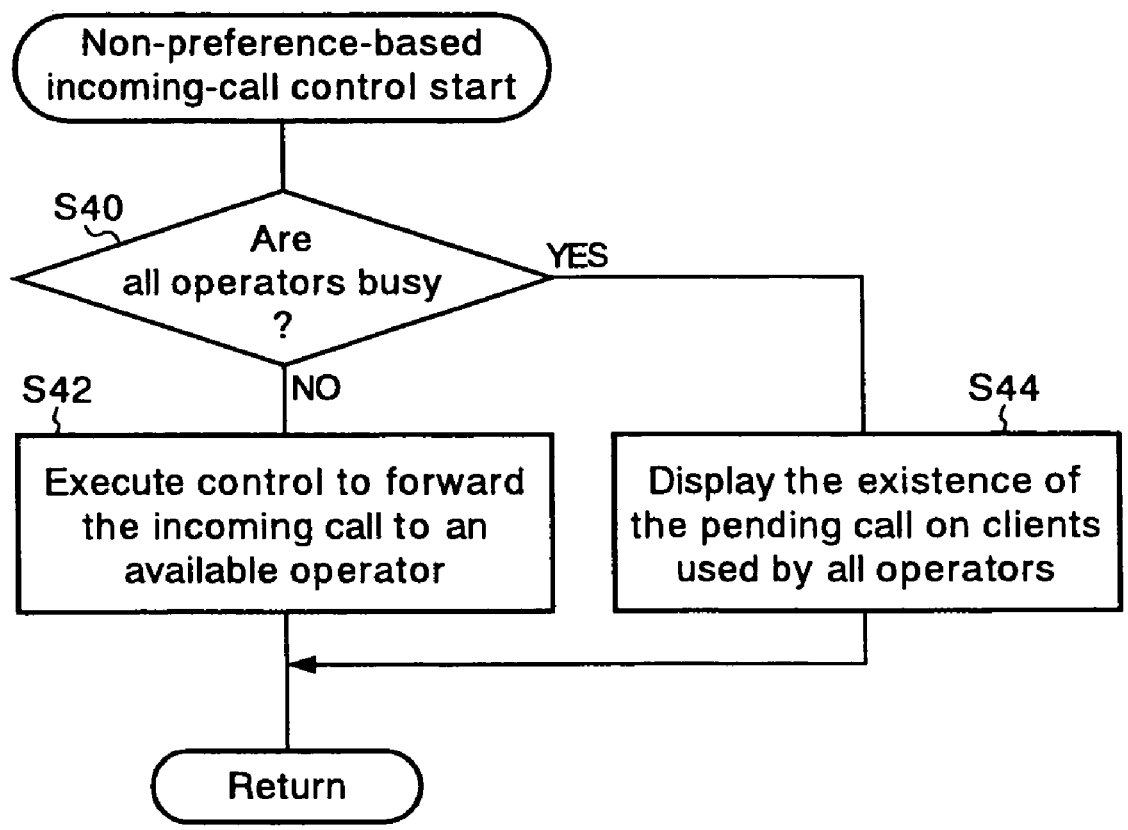
FIG. 17 is a flowchart of incoming-call control not executed on a preference basis.

FIG. 17 is a flowchart of the non-preference-based incoming-call control executed not on a preference basis at the step S10 of the flowchart shown in FIG. 15 and the step S36 of the flowchart shown in FIG. 16. The flowchart shown in FIG. 17 begins with a step S40 to form a judgment as to whether or not all the operators are in working status. If all the operators are in working status, the flow of the control goes on to a step S44. If not all the operators are in working status, on the other hand, the flow of the control goes on to a step S42. At the step S42, the incoming call is routed to an available operator not in working -status. The operator is selected so as to produce a balanced distribution of loads among the operators as described above. At the next step S44, a command is issued to display the waiting-call display 180 on each of clients 36#i used by the other operators in a deemphasized state where i=1, 2 and so on. The clients 36#i each display the waiting-call display 180 in a deemphasized state accordingly.

(3) Operator Operation

Figure 18:
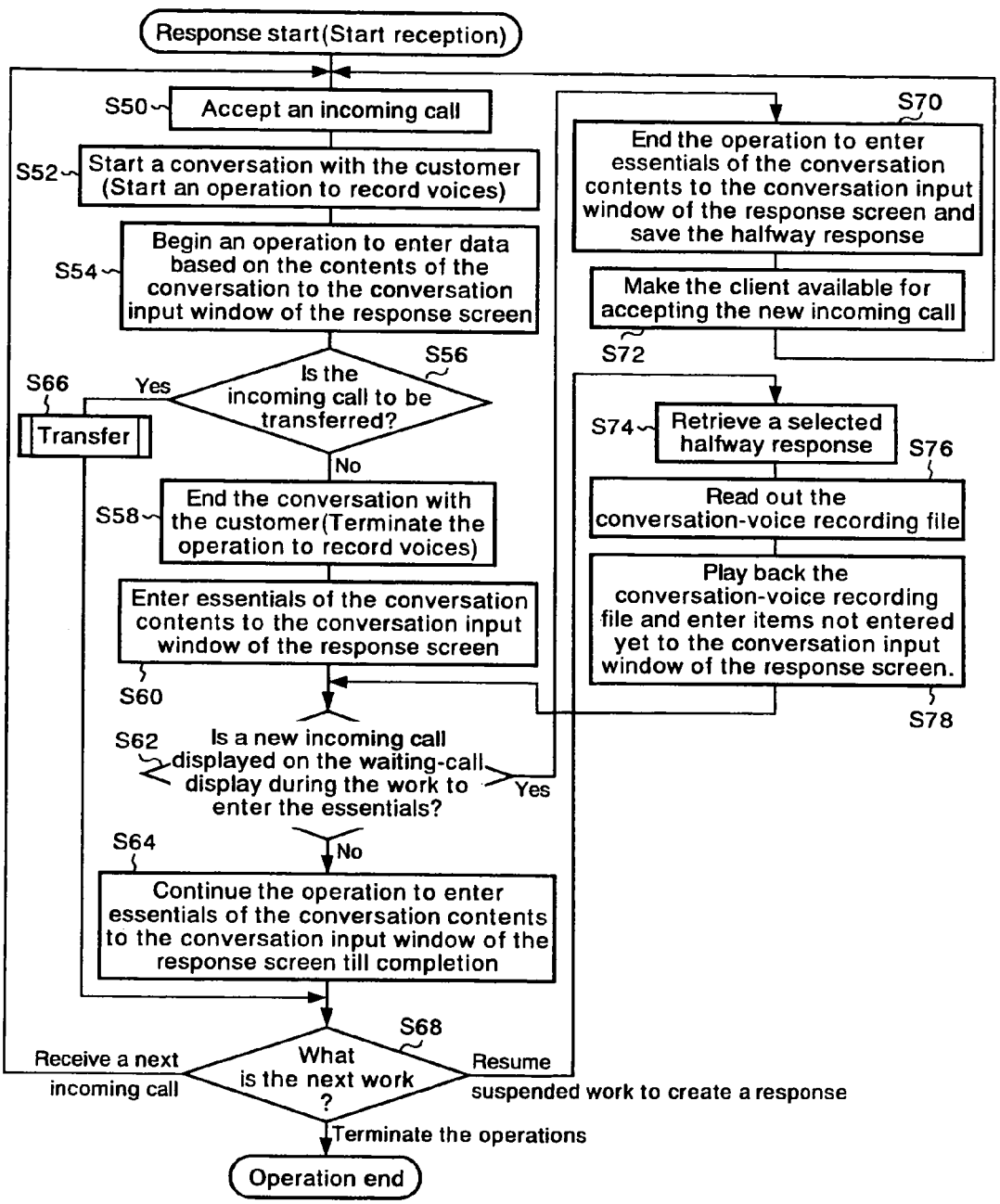
FIG. 18 is a flowchart showing typical operations carried out by an operator.

FIG. 18 is a flowchart showing typical operations carried out by an operator. As shown in the figure, the flowchart begins with a step S50 at which the operator clicks the response button 172 in response to an incoming call as evidenced by a sound output by the ringer to the head set 102#i. After assigning a reception number to the incoming call, the client 36#i requests the database server 34 to output an information history associated with the telephone number of the caller. Typically, significant digits of the reception number are the number of the client 36#i or the ID of the operator while insignificant digits thereof are a sequence number assigned to the incoming call. The database server 34 searches the response-file-storing database 90 for an information history associated with the telephone number. If such an information history is found, the information history is transmitted to the client 36#i. The client 36#i displays the information history on the response history screen 156. In this way, the operator is capable of receiving the incoming call while looking at the displayed information history. As a result, the service rendered by the call center system can be improved.

At the next step S52, the operator starts a conversation with the customer. At the same time, the client 36#i commences an operation to record contents of the conversation into the hard disk 114#i. The contents of the conversation can be an inquiry about a product, a complaint, an order for a product or any other matters. At the next step S54, the operator begins an operation to enter data based on the contents of the conversation to the conversation input screen 158 of the response screen 154. At the next step S56, the operator makes a decision as to whether or not to transfer the incoming call. If the incoming call is to be transferred, the flow of the operations goes on to a step S66 at which the call is transferred to a person well familiar with a response to the caller. An example of such a person is a supervisor. If the incoming call is not to be transferred, on the other hand, the flow of the operations goes on to a step S58 at which the operator completes the conversation with the customer and then clicks the disconnecting button 174. When the disconnecting button 174 is clicked, an on-hook command is issued in the client 36#i to stop the operation to record a voice into the hard disk 114#i. At the next step S60, the operator enters essentials of the conversation contents to the conversation input screen 158 of the response screen 154. Then, the flow of the operations goes on to a step S62 to form a judgment as to whether or not a new incoming call is displayed on the waiting-call display 180 during the work to enter the essentials. If no new incoming call is displayed, the flow of the operations goes on to a step S64. If a new incoming call is displayed, on the other hand, the flow of the operations goes on to a step S70. If the display of the new incoming call is emphasized in particular, the operator makes a decision to immediately proceed to the work of the step S70.

At the step S64, the operator continues the operation to enter essentials of the conversation contents to the conversation input screen 158 of the response screen 154. As the operation to enter the essentials is completed, the saving button 202 is clicked to request the client 36#i to supply a response recording file, a conversation-voice recording file and the reception number to the database server 34. The database server 34 stores the response recording file and the conversation-voice recording file in the response-file-storing database 90 and the voice-file-storing database 92 respectively, linking the response recording file to the conversation-voice recording file by means of the reception number. At the next step S68, a next response work is determined. In the first place, the operator is ready to respond to a next call by clicking the working-status button 176. In this case, the flow of the operations goes back to the step S50. As a first alternative, a logoff is desired to terminate the operations to quit the work or have a break time. In this case, the client 36#i used by the operator is deleted from a list in the ACD group. As a second alternative, the operator wants the database server 34 to output a list of halfway-response files created by the operator previously by clicking the halfway-response display button 204. As a third alternative, the operator wants the database server 34 to output a list of halfway-response files created by all operators by clicking the all display button 206. In the case of the second and third alternatives, the database server 34 searches the halfway-response-file-storing database 94 for the desired halfway-response files, creates a list of such files and transmits the list to the client 36#i. The client 36#i displays the list on the halfway-response list screen 208. Then, the flow of the operations go on to the step S74.

At the step S70, the operator terminates the operation to enter the contents of the conversation to the response screen 154 and clicks the halfway-saving button 200. The client 36#i reads out the conversation-voice recording file and the halfway-response recording file from the hard disk 114#i, transmitting the conversation-voice recording file, the halfway-response recording file and the reception number to the database server 34. The database server 34 stores the halfway-response recording file and the conversation-voice recording file in the halfway-response-file-storing database 94 and the voice-file-storing database 92 respectively, linking the response recording file to the halfway-response recording file by means of the reception number. At the next step S72, the operator clicks the working-status button 176 to put the client 36#i in idle state. That is to say, the client 36#i is put in available status appearing to the ACD apparatus 32 as status of being able to receive a next call.

As all pending incoming calls are routed to available clients 36#i where i=1, 2 and so on as described above, the ACD apparatus 32 requests each of the clients 36#i to clear the waiting-call display 180. Then, the clients 36#i each clear the waiting-call display 180 accordingly.

At the step S74, the operator clicks one of reception numbers displayed on the halfway-response list screen 208. The client 36#i requests the database server 34 to output a halfway-response recording file indicated by the clicked reception number. The database server 34 reads out the halfway-response recording file from the halfway-response-file-storing database 94 and transmits the file to the client 36#i. The client 36#i stores the halfway-response recording file in the hard disk 114#i. Then, a response is fetched from the halfway-response recording file and supplied to the conversation input screen 158. At the next step S76, the client 36#i requests the database server 34 to output a conversation-voice recording file indicated by the reception number clicked at the step S74. The database server 34 reads out the conversation-voice recording file from the voice-file-storing database 92 and transmits the file to the client 36#i. The client 36#i stores the conversation-voice recording file in the hard disk 114#i. At the next step S78, the operator clicks the playback button 220, the fast-feed button 222 or the stop button 224 to play back the conversation-voice recording file and entering items not entered yet so far to the conversation input screen 158. In this way, when there is no waiting incoming call, a response recording file can be completed by listening to a conversation-voice recording file associated with the halfway-response recording file. In addition, a response recording file based on a halfway-response recording file created by another operator can be produced to improve the work efficiency. Then, the flow of the operations go back to the step S62.

Figure 19:
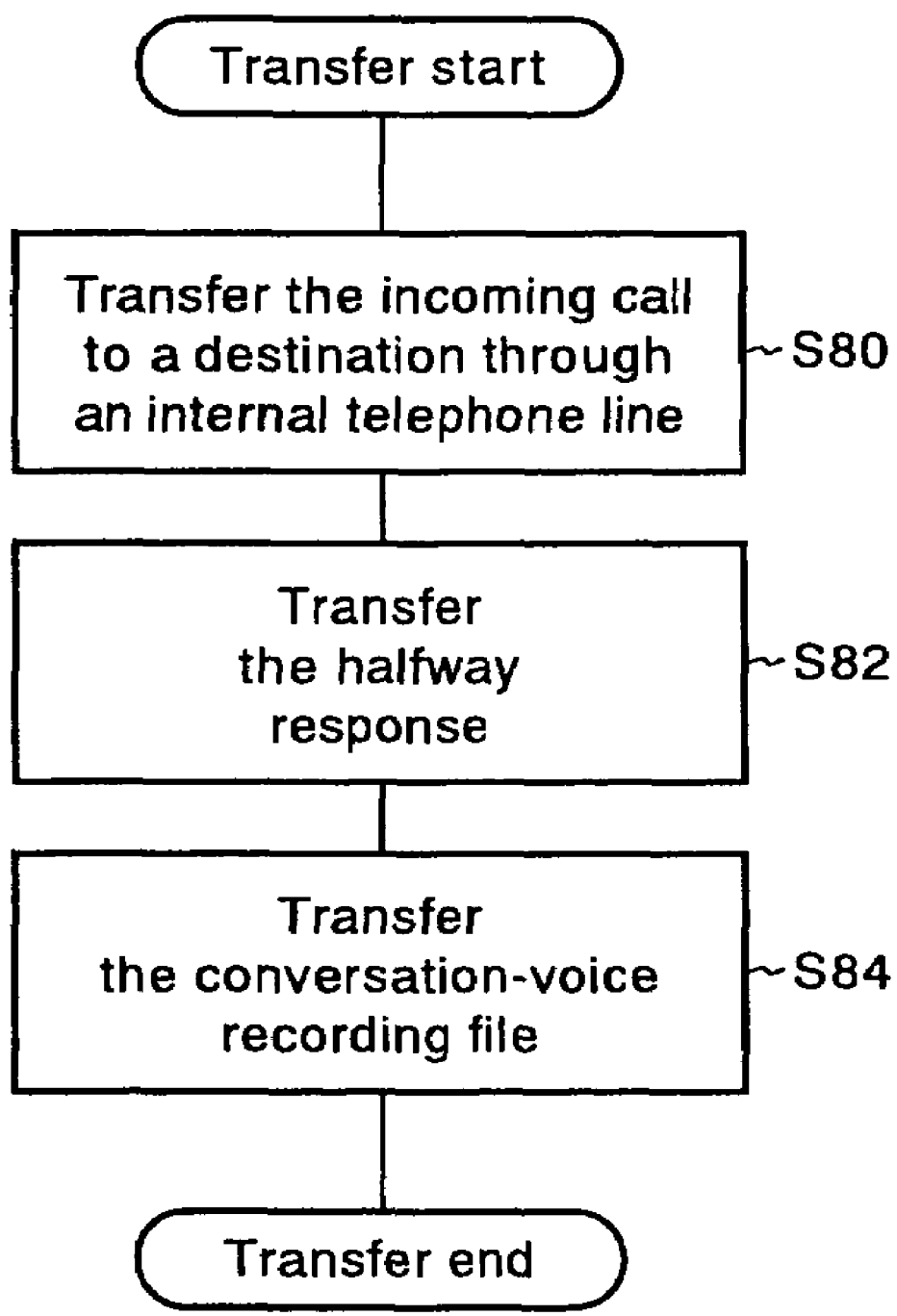
FIG. 19 shows a flowchart of transfer processing.

At the step S66, the following transfer processing is carried out. FIG. 19 shows a flowchart representing the transfer processing. An operator may desire to transfer an incoming call from a customer to a supervisor or the like. In this case, the operator needs to use the transfer button 178 and the operator list screen 160. First of all, when the operator list screen 160 is clicked, the client 36#i requests the ACD apparatus 32 to provide the client 36#i with the names of operators using clients 36#j to which an incoming call can be transferred where j≠i. The ACD apparatus 32 searches an ACD group to which the operator using the client 36#i pertains for names of operators using such clients 36#j. The ACD apparatus 32 makes a list of such operator names and transmits the list to the client 36#i. The client 36#i displays the list received from the ACD apparatus 32 on the operator list screen 160.

At the first step S80 of the flowchart shown in FIG. 19, the operator selects the name of another operator on the list displayed on the operator list screen 160. The other operator, the name of which is selected, is an operator to which an incoming call is to be transferred. The client 36#i transfers an incoming call to a client 36#j used by the other operator through the extension line. The client 36#j starts an operation to record the contents of a conversation with a customer, the incoming call from which is transferred. At the next step S82, the client 36#i transfers a halfway-response recording file and a reception number to the client 36#j. The client 36#j stores the halfway-response recording file received from the client 36#i in the halfway-response-file-storing database 94. At the next step S84, the client 36#i transfers a conversation-voice recording file and the reception number to the client 36#j. The client 36#j stores the conversation-voice recording file received from the client 36#i in the voice-file-storing database 92.

The client 36#j displays the contents of the halfway-response recording file on the conversation input screen 158. The operator of the client 36#j succeeds to the work of creating the halfway response to the customer and completes the halfway-response recording file. The operator of the client 36#j may be a supervisor or the like well familiar with the response. In this way, the efficiency of the service to provide a response can be improved. At that time, a response recording file may be created, being linked to a plurality of conversation-voice recording files by means of a reception number as shown in FIG. 7. Thus, even if a newly incoming call is put in a waiting state after a preceding call has been transferred as described above, the response recording file being created can be saved as a halfway-response recording file linked to a plurality of conversation-voice recording files so that the halfway-response recording file can be completed later by listening to the conversation-voice recording files. In this way, even a fixed number of operators is capable of keeping up with a large fluctuation of the number of incoming calls with a high degree of efficiency. In addition, by playing back a conversation-voice recording file containing the audio contents of a conversation, an operator is capable of reflecting voices of a customer in a response with a high degree of efficiency in comparison with the conventional call center system in which later processing to enter and add data is based on a memo. Moreover, a fast response can be given even in the case of a waiting incoming call, making it possible to provide an operation that fully satisfies customers and entails only short wait times of customers. As described above, according to the present invention, a fixed number of operators operating clients employed in the call center system is capable of responding to incoming calls at the maximum of ability and the operation can be carried out with a high degree of flexibility to keep up with a fluctuating number of incoming calls arriving at the same time. As a result, it is possible to construct and provide a call center system that is capable of fully satisfying customers at a high performance.

It should be noted that the present invention is not limited to the details of the preferred embodiments described above. The scope of the present invention is defined by the following appended claims, and all changes and modifications falling within the scope of the claims are therefore to be embraced by the invention.

What is claimed is:

1. A call center system comprising:
   a first unit to record a voice of a conversation between an operator and a caller into a first file; and
   a second unit to store a corresponding relationship between the first file and a second file which includes information which has been halfway inputted based on the conversation, after the recording of the conversation has been completed.

2. A call center system of claim 1, wherein a second unit to store a corresponding relationship between the first file and a second file which includes information which has been halfway inputted based on the conversation, after the recording of the conversation has been completed and then another call has been received.

3. A call center system of claim 1, wherein the second file is a database.

4. A call center system of claim 1, wherein the information is a part of essential information to be inputted by the operator.

5. A call center system of claim 1, further comprising:
   a server; and
   a terminal;
   wherein the terminal is operated by the operator for inputting the information of the conversation and the second file is a database included in the server connected to the tenninal via a network.

6. A call center system of claim 1, wherein a second unit to store a corresponding relationship between the first file and a second file which includes information which has been halfway inputted based on the conversation, in accordance with a command given by the operator and identifier identifying the conversation, after the recording of the conversation has been completed.

7. A call center system of claim 6, further comprising a server; and
   a terminal;
   wherein the terminal is operated by the operator for inputting the information of the conversation and the second file is a database included in the server connected to the terminal via a network.

8. A call center system of claim 6, wherein the second unit stores a corresponding relationship between the first file and the second file, after the recording of the conversation has been completed and then another call has been received.

9. A call center system of claim 6, wherein the second unit stores a corresponding relationship botween an identifier identifying the conversation, the first file, and the second file when another call has been received.

10. A call center system of claim 8, wherein a third unit stores essential information inputted by the operator into the database by playing back the first file, after the another call has been completed.

* * * * *